United States Patent [19]

Nuytten

[11] Patent Number: 4,549,753
[45] Date of Patent: Oct. 29, 1985

[54] ROTARY JOINT

[75] Inventor: Rene T. Nuytten, North Vancouver, Canada

[73] Assignee: Can-Dive Services Ltd., North Vancouver, Canada

[21] Appl. No.: 424,339

[22] Filed: Sep. 27, 1982

[51] Int. Cl.[4] ............................................. F16L 27/00
[52] U.S. Cl. ...................................... 285/95; 285/184; 285/281; 285/DIG. 1
[58] Field of Search ................... 285/DIG. 1, 95, 281, 285/11, 184; 277/135

[56] References Cited

U.S. PATENT DOCUMENTS

| | | |
|---|---|---|
| 1,146,781 | 7/1915 | Bowdoin . |
| 1,888,026 | 11/1932 | Chapman . |
| 1,947,657 | 2/1934 | Peress . |
| 2,279,969 | 4/1942 | Casperson . |
| 2,421,691 | 6/1947 | Gibson, Jr. et al. ...... 285/DIG. 1 X |
| 2,557,140 | 6/1951 | Razdowitz . |
| 2,726,104 | 12/1955 | Boitnott et al. . |
| 3,466,061 | 9/1969 | Fonda-Bonardi . |
| 3,473,832 | 10/1969 | Kreidel, Sr. et al. . |
| 3,754,779 | 8/1973 | Peress . |
| 3,759,550 | 9/1973 | Peress . |
| 3,776,578 | 12/1973 | Jessup et al. ............. 285/DIG. 1 X |
| 3,826,396 | 7/1974 | Frassica . |
| 3,889,985 | 6/1975 | Gartmann ................ 285/DIG. 1 X |
| 3,913,951 | 10/1975 | LeFebvre, Jr. . |
| 4,101,148 | 7/1978 | Lee . |
| 4,156,530 | 5/1979 | Rivkin et al. . |

FOREIGN PATENT DOCUMENTS

| | | |
|---|---|---|
| 1256008 | 12/1967 | Fed. Rep. of Germany ...... 285/281 |
| 400386 | 10/1933 | United Kingdom . |
| 959700 | 6/1964 | United Kingdom . |
| 1333715 | 10/1973 | United Kingdom . |
| 1603163 | 11/1981 | United Kingdom . |

OTHER PUBLICATIONS

Engineering Evaluation Presentation: Zero Decompression Diving Suit; by ILC Industries, Inc. (Excerpts), Jul. 1970.
Powered Atmospheric Diving Suit; by Normalair-Garrett Limited (Excerpts), Jan. 1977.
Deep Diving and Submersible Operations; by Sir Robert H. Davis (Excerpts).
Three Miscellaneous Sheets of Drawings, First Two by Underwater & Marine Equipment Ltd.-1974.

*Primary Examiner*—Thomas F. Callaghan
*Attorney, Agent, or Firm*—Shlesinger Arkwright Garvey & Fado

[57] ABSTRACT

A rotary joint is provided which is particularly useful in deep-sea diving suits, and which can be constructed in such a way such that resistance to rotational movement or the potential for leakage, does not increase substantially with external pressure on the joint. Preferably, the joint has a sealing member, a retaining member, and a central member disposed axially between the sealing and retaining members. The central member has an annular first end dimensioned and axially slidably mounted on a retaining end of the retaining member so as to define a first variable volume chamber therebetween. The central member also has a second end with inner and outer extending annular bearing members, each concentric with, and normally rotatably abutting a corresponding sealing surface portion on the sealing member, so as to define annular side walls of a second chamber. The second chamber is interconnected with the first chamber.

11 Claims, 4 Drawing Figures

ROTARY JOINT

FIELD OF THE INVENTION

This invention relates to a rotary joint which is particularly useful for deep-sea diving suits and similar apparatus.

DESCRIPTION OF PRIOR ART

In deep-sea diving suits in particular, it is desirable to have joints which can readily rotate, as well as joints which are capable of flexion-extension. A number of such joints have been provided in the past. However, as external pressure on the joints increases, as will occur when a diving suit is submerged to greater depths, such joints tend to experience severely increased friction. Longitudinally flexible joints have been described in the past which utilize a fluid-filled chamber to attempt to minimize such increased friction. For example, U.S. Pat. No. 3,759,550 to Peress discloses a flexible joint having an annular, partially spherical, male member movably housed within an annular, partially spherically female member. The chamber formed between the male and female members is filled with a suitable fluid. Sealing means are provided on the female member wall. Although such a configuration helps to reduce the effect of increased external pressure, such configuration suffers from the difficulty that over a period of use a small amount of liquid from the chamber be lost, and the male and female members thereby get out of alignment, resulting in jamming of both members when it is attempted to flex the joint. As well, great care must be taken to ensure that there are no small air bubbles remaining within the fluid in the chamber, since again at high external pressure such air will tend to compress resulting in a decrease of the volume of the chamber and consequent misalignment of the male and female members and seizure of the joint. Such a result can also follow where the joint is subjected to a very high external pressure, since even liquids are compressible to some degree under such pressures. In addition, the seals on the female member must press hard against the male member to prevent oil leakage into the hollow tubes connected by the joint. Such pressing is itself a source of rotational friction.

Other joints have been described in the past, which utilize a fluid-filled chamber between the two connecting sections, such joints are disclosed for example, in U.S. Pat. No. 2,557,140 to Razdowitz, U.S. Pat. No. 3,754,779 to Paris, and U.S. Pat. No. 1,888,026 to Chapman. Such joints though, tend to suffer from one or more of the above difficulties or from relative complexity of structure or leakage at high external pressures.

It is desirable then to provide a rotary joint, a plurality of which can be used to form a flexion-extension joint, which flexion-extension joint would be particularly useful in deep-sea diving, and in which rotational friction of each rotary joint would not be substantially increased with large increases in external pressure, which would maintain a good seal despite such large increases in pressure, and which is relatively simple to assemble.

SUMMARY OF THE INVENTION

A first embodiment of a rotary joint is provided which comprises a sealing member having a sealing end with an annular axially facing, sealing surface portion. A retaining member is provided which has a circular retaining end concentric with the sealing surface portion of the sealing member. In addition, a central member is provided which is disposed axially between the sealing and retaining members, and which has a circular second end, and a first end. The second end is dimensioned and axially slidably mounted on the retaining end of the retaining member, so as to define a first variable volume chamber therebetween. The first end of the central member has an annular bearing member concentric with, and normally rotatably abutting the sealing surface portion, so as to define an annular side wall of a second chamber between the first end and the sealing end of the sealing member. The second chamber is interconnected with the first chamber.

In a second embodiment of the invention, a sealing member is provided which has a sealing end with concentric, inner and outer sealing surface portions facing in the same axial direction. A retaining member is provided which has an annular retaining end concentric with the sealing surface portions of the sealing member. Such an embodiment also comprises a central member axially disposed between the sealing and retaining members. The central member has an annular first end dimensioned and axially slidably mounted on the retaining end of the retaining member so as to define a first variable volume chamber therebetween. The central member also has a second end with inner and outer axially extending annular bearing members, each concentric with, and normally rotatably abutting a corresponding one of the sealing surface portions, so as to define annular side walls of a second chamber between the first end and the sealing end of the sealing member. The second chamber is interconnected with the first chamber.

Preferably, the central member has a first inner surface defining a wall of the first chamber and axially facing the retaining end of the retaining member, and a second inner surface defining a wall of the second chamber and axially facing the sealing surface of the sealing member.

Advantageously, the total transverse area of the first inner surface is at least as great as the total transverse area of the second inner surface. Most preferably, those total transverse areas are equal.

Resilient means is also usefully additionally provided, which extend between the retaining member and the sealing member, for urging the bearing members against respective sealing portions.

Of the possible means of interconnecting the first and second chambers, it is preferred that they are interconnected by means of an opening through the central member.

The sealing surface portions of the sealing member are usefully constructed to lie in a common transverse plane, the bearing members being arranged to extend substantially perpendicular from the respective sealing portions.

Of the possible relative average diameters of the first and second chambers, it is preferred that they have the same average diameter.

DRAWINGS

An embodiment of the invention will now be described with reference to the drawings in which.

DESCRIPTION OF THE PREFERRED EMBODIMENTS

Figure 1:
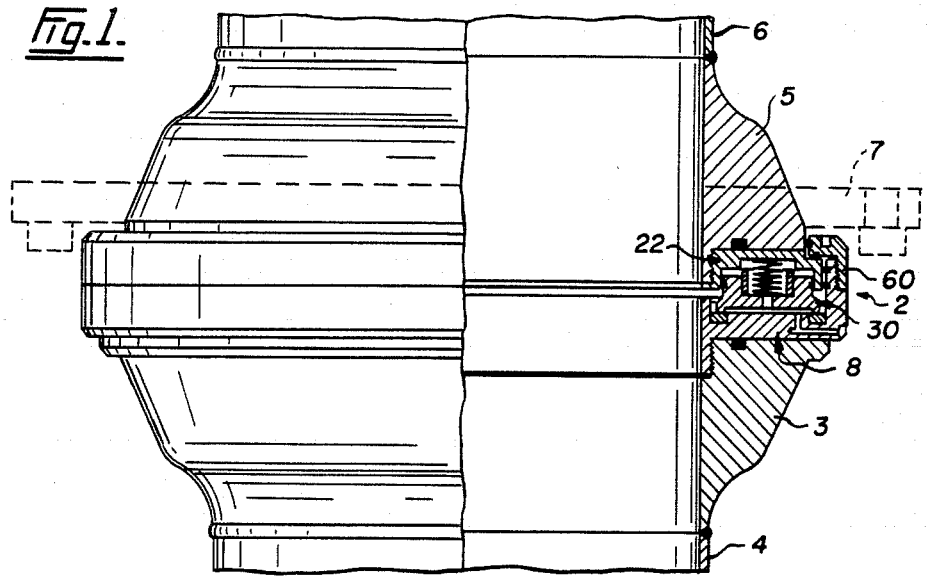
FIG. 1, is a partially cut-away side elevation of a rotary joint of the present invention.
Figure 2:
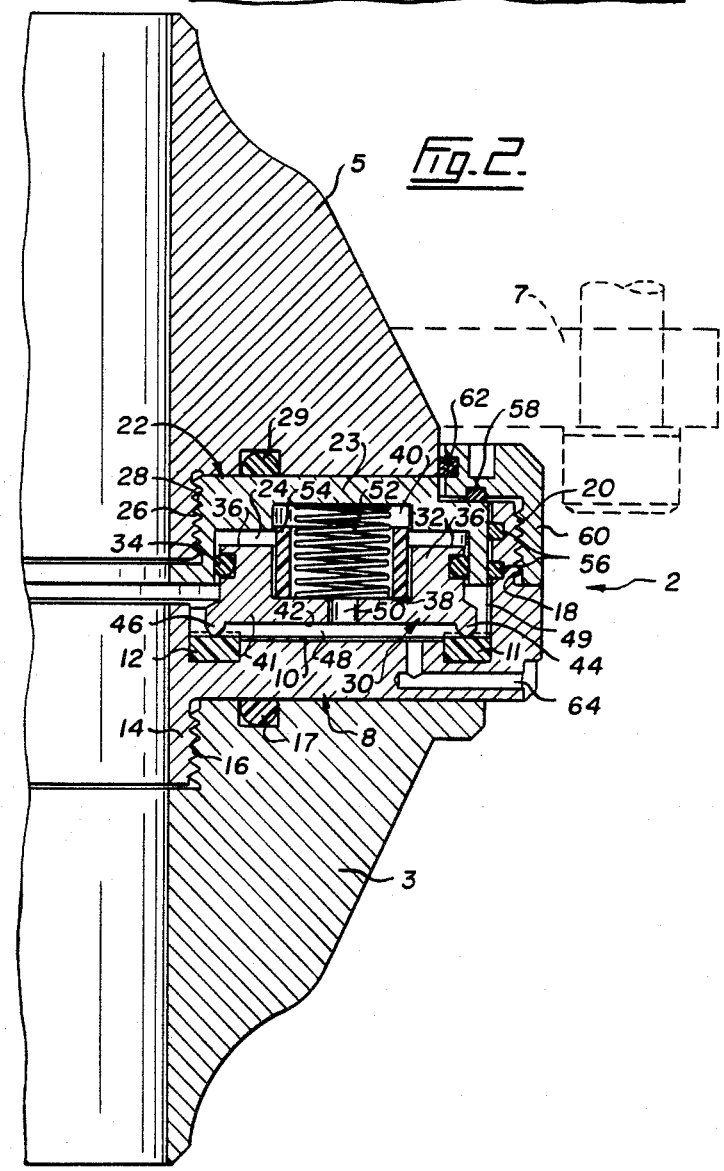
FIG. 2 is an enlarged portion of the cut-away portion of FIG. 1.

Referring first to FIGS. 1 and 2, a rotary joint 2 is provided which connects cylindrical tubes 4 and 6, each of which has an annular support portion 3 and 5 respectively for the rotary joint 2. Annular portion 5 can be replaced with an annular flange 7 (shown in broken lines) if it is desired to connect the joint to a flat surface. The rotary joint 2 has a sealing member 8 with a sealing end 10 extending between and supporting inner and outer annular sealing surface portions 11 and 12 respectively. The sealing surface portions 11 and 12 face in the same axial direction and lie in a common transverse plane, that is, their upper surfaces as is shown in FIGS. 1 and 2 lie in the same transverse plane. The sealing member 8 has an extension 14 threaded on its inside so as to mate with threaded portion 16 of support 3. An annular sealing ring 17 is provided between support 3 and sealing member 8 so as to prevent water leakage therebetween. The support member 8 also has a second annular threaded portion 18, the threads of which mate with threaded portion 20 of collar 60.

A retaining member 22 is provided which is axially spaced from sealing member 8. The retaining member 22 is provided with an annular retaining end 23, the retaining end 23 being that portion adjacent the annular recess 24 in retaining member 22, which retains an end of a central member 30. The annular end 23 is concentric with the sealing surface portions 11 and 12. The retaining member 22 is also provided with an outwardly threaded portion 26 which mates with a threaded portion 28 of the support 5. An annular sealing ring 29 is provided between the support 5 and sealing member 22 to prevent water leakage therepast.

The central member 30 is disposed axially between the sealing member 8 and retaining member 22. The central member 30 is provided with an annular first end 32 which is axially slidably mounted within the recess 24 of the retaining end 23 by means of a sealing O-ring 34 extending therebetween, so as to define a first variable volume chamber 40 between the first end 32 of central member 30 and the retaining end 23 of retaining member 22. The first end 32 of the central member 30 has a first inner surface which is the combination of annular surface portions 36 and 38, this inner surface axially facing the retaining end 23 of the retaining member 22. The central member 30 also has a second end 41 with a second inner surface 42 axially facing the sealing end 10. The total transverse area of the first inner surface (that is, the total transverse area of surface sections 36 and 38) is equal to the total transverse area of the second inner surface 42.

The central member 30 also has inner and outer axially extending annular bearing members, 44 and 46 respectively. Each of the bearing members 44 and 46 is concentric with, and normally rotatably abuts a corresponding one of the sealing surface portions 11 and 12 respectively. In such a configuration, the bearing members 44 and 46 define annular side walls of a second chamber 48 between the first end 41 of the central member 30 and the sealing end 10 of the sealing member 8.

The second chamber 48 is interconnected with the first chamber 40 by means of an annular opening 50 through the central member.

A plurality of springs 52 are provided within the first chamber 40, which springs extend between the retaining end 23 of the retaining member 22, and the surface portion 38 of the central member 30, so as to urge the bearing members 44 and 46 against respective sealing surface portions 11 and 12. A hollow cylindrical housing 54 is provided for each spring 52 in order to help retain the shape of that spring 52.

The annular portion 18 of sealing member 8 is provided with two annular radially extending bearing rings 56, which both abut the retaining member 22 but do not abut it with such force that water under pressure cannot pass therebetween and into a third chamber 49. The outer collar 60 is also provided with an annular bearing ring 58, and felt wiper 62, which respectively abut retaining member 22 and support 5, but again allow water under pressure to pass therebetween. A bore 64 extends between the chamber 48 and the exterior of the rotary joint.

The rotary joint as described is typically constructed from steel, the bearing members 44 and 46 preferably being of stainless steel. The sealing surface portions 11 and 12, and annular bearing rings 56 and 58, can be made of a deformable low friction material, for example, an epoxy bonded tetrafluoroethylene plastic, such as that sold under the trade mark TEFLON. The joint can be assembled by first screwing on portion 14 of sealing member 8 onto the threaded portion 16 of support portion 3. The central member 30, springs 52 and supports 54, can then be positioned between the sealing member 8 and the support member 22 with sufficient force being applied to retaining member 22 so that collar 60 can be screwed onto threaded portion 18 of sealing member 8. The threaded portion 26 of retaining member 22 may then be screwed onto the threaded portion 28 of support member 5. Following this procedure, the chambers 40, 48 and annular opening 50 can then be filled with oil through oil passage 64. Oil passage 64 can then be sealed in any suitable manner, such as with a threaded plug.

The operation of one rotary joint 2 is as follows. When the joint is submerged in water, chamber 49 will fill with water flowing past wiper 62 and bearing surfaces 58 and 56. When the joint is subjected to high external pressure, tubes 4 and 6 and respective support portions 3 and 5 will tend to telescope inward to compress the joint 2. This force of compression will be translated into a fluid pressure in chambers 40, 48 and annular hole 50. As a result of such fluid pressure, a force will be generated in chamber 40 between the retaining surface 23 of retaining member 22, and the first end 32 of central member 30. This force will vary directly with the total surface area of the first surface of first end 32 which is facing the retaining end 23 (again, this being the total surface area of surface portions 36 and 38). This force will tend to push the central member 30 toward the sealing member 8. In addition though, a force will be produced in chamber 48 which is proportional to the total transverse surface area of the second surface 42. This force will tend to push central member 30 away from the sealing member 8. When the whole transverse surface area of the first inner surface facing the retaining end 23 of retaining member 22 (that is, the total transverse surface area of surface portions 36 and 38) is equal to the total transverse surface area of the second surface 42 facing the sealing surface 10, the two mentioned forces will be equal and the central member 30 will tend to stay in a position with the bearing members 44 and 46 rotatably abutting respective sealing surface portions 11 and 12 as a result of only a net pressure from springs 52. Should a small amount of oil be lost from chambers 40, 48 and annular opening 50 after a period of use of the joint 2, or should the joint be used under very high external pressures resulting in compression of any gas bubbles which may be present in those chambers or opening, or slight compression of the oil, the net effect will simply be that bearing member 22 will be moved slightly closer toward sealing member 8. Thus, a diving suit utilizing a number of such joints would tend to contract in size a very slight amount under such circumstances. The retaining member 22 and support 5 can be rotated relative to sealing member 8 and support 3, the only resistance to such being primarily a result of spring pressure only through bearing surfaces 44 and 46 to sealing surfaces 11 and 12, as those bearing surfaces rotate thereon. Since a water tight fit is not required at felt wiper 62 and bearing rings 56, 58 and ring 62, little resistance is offered by them to rotation of joint 2, such elements serving primarily merely to keep dirt out of the joint 2.

The springs 52 ensure that a constant pressure is maintained on bearing members 44 and 46 against their respective slightly deformable sealing surface portions 11 and 12, respectively, so as to prevent water or oil from leaking therepast.

Figure 3:
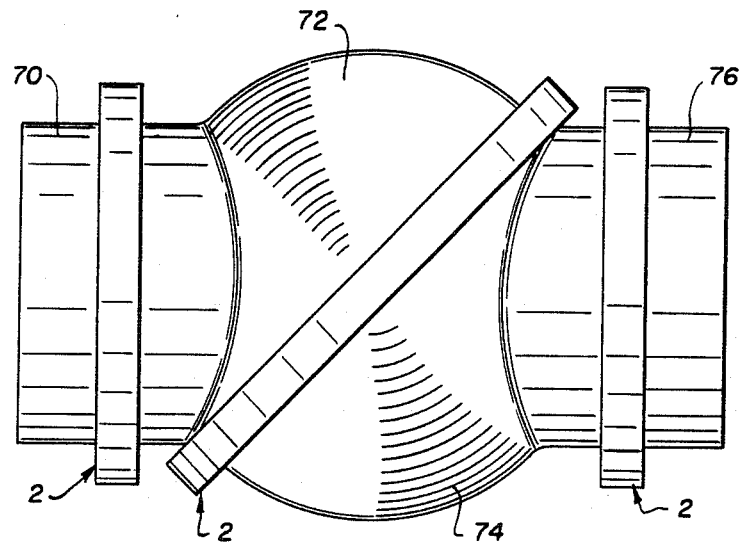
FIG. 3 is a side elevation of a flexion-extension joint incorporating three rotary joints of the present invention.
Figure 4:
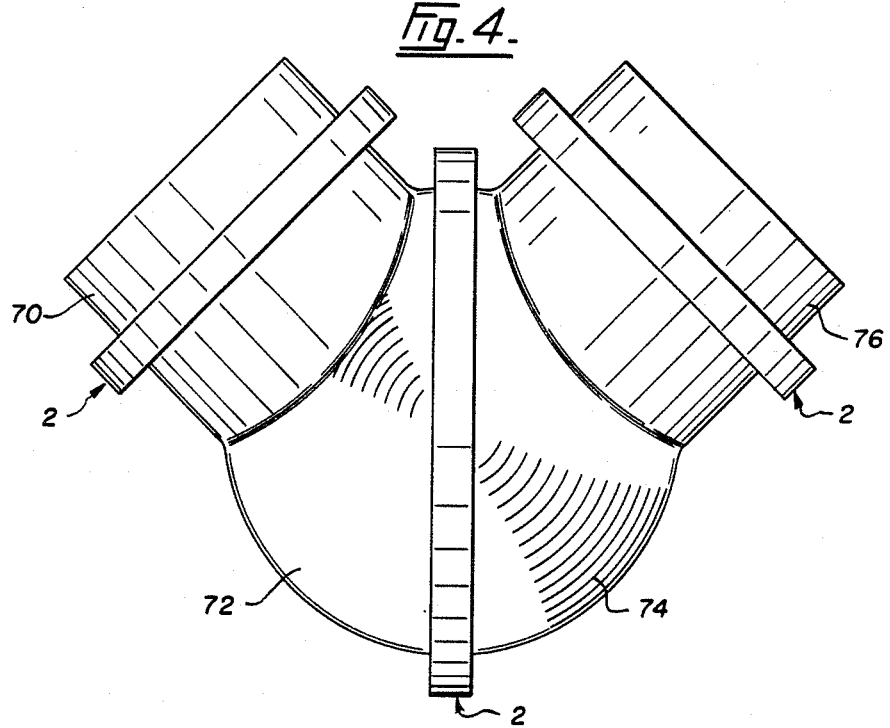
FIG. 4 is a side elevation view of the joint of FIG. 2, flexed approximately 90° from the position shown in FIG. 2.

A number of such joints 2 can be utilized to produce a flexion-extension joint in the manner shown in FIGS. 3 and 4. A first tubular portion 70 is connected through a joint 2 to a partially spherical portion 72, which is in turn connected through another joint 2 to another partially spherical tubular portion 74. This second partially spherical tubular portion 74 is connected through a third joint to a second tubular portion 76. Thus, a flexion-extension joint is created. When an internal force is applied to tubular sections 70 and 76, for example by flexing of a limb, sectons 72 and 74 will rotate by means of their respective joints 2 interconnecting them with adjacent tubular portions 70 and 76 respectively, so as to bring their narrowest sections together at one point and their widest sections together at a point slightly less than 180° away or any degree inbetween. Thus, the configuration in FIG. 4 (which shows the joint bent at an angle of slightly less than 90°) or any desired bend less than that shown in FIG. 4 is obtained by such flexion. Blocks (not shown) must be provided on the two outermost joints 2 on two of the tubular portions, which will contact one another prior to the joint flexing to 90° and prevent further flexion. Should the joint reach 90°, it would of course lock up and could no longer be straightened.

Various modifications to the rotary joint as described above are of course possible. For example, where one shaft is to be rotatably joined to another shaft, and there is no need for the interior of the shafts to interconnect, then of course a circular rotary joint could be utilized, the entire vertical cross section of which would appear the same as the cut-away portion of FIG. 1. In addition, although the joint has been shown with the first chamber 23 and second chamber 48 having the same average diameter, it is not essential that this be so, it being possible to offset the two chambers. Another variation includes making the total transverse surface area of the first surface of the central member 30 larger than the total transverse surface area of the second surface 42 of that member. Such a construction would have the advantage that provided the joint was maintained under some external pressure, no springs 52 would be required. However, the pressure on bearing members 44 and 46 against respective sealing surface portions 11 and 12 would increase proportionately with increasing external pressure on the joint 2. The absolute value of this latter pressure at any given external pressure can of course be varied simply by varying the total transverse surface areas of the first surface and second surface of the central member 30 which are axially facing the retaining end 23 and sealing end 10 respectively. Alternatively, should for some purpose a user require a joint on which the bearing pressure decreases with external pressure, the total transverse surface area of the second surface 42 which is axially facing the sealing surface 10, can be made greater than the total transverse surface area of the first surface of central member 30 which is axially facing the retaining end 23. The first and second inner surfaces of the central member 30 could in fact be eliminated so that central member 30 is simply a hollow tube. However, such a configuration eliminates a convenient location for the springs 52. In addition, the bearing surfaces 44 and 46 need not be perpendicular to the common transverse plane which the sealing surface portions 11 and 12 lie, as is the situation disclosed in the drawings. However, such a configuration is preferred since it provides maximum pressure resistance of the joint.

As will be apparent to those skilled in the art in light of the foregoing disclosure, many alternations and modifications are possible in the practice of this invention without departing from the spirit or scope thereof. Accordingly, the scope of the invention is to be construed in accordance with the substance defined by the following claims.

I claim:

1. A rotary joint comprising:
   (a) a sealing member having a sealing end with an annular axially facing, sealing surface portion;
   (b) a retaining member having a circular retaining end concentric with the sealing surface portion of said sealing member;
   (c) a central member disposed axially between said sealing and retaining members, and having:
      (i) a circular first end dimensioned and axially slidably mounted on the retaining end of said retaining member so as to define a first variable volume chamber therebetween;
      (ii) a second end with an annular bearing member concentric with, and normally rotatably abutting the sealing surface portion, so as to define an annular side wall of a second chamber between the first end and the sealing end of said sealing member, which second chamber is interconnected with the first chamber;
   such that fluid pressure produced in the first chamber as a result of axial pressure pushing said retaining member toward said sealing member, is transmitted to said second chamber.

2. A rotary joint comprising:
   (a) a sealing member having a sealing end with concentric, inner and outer annular sealing surface portions facing in the same axial direction;
   (b) a retaining member having an annular retaining end concentric with the sealing surface portions of said sealing member;

(c) a central member disposed axially between said sealing and retaining members, and having;
  (i) an annular first end dimensioned and axially slidably mounted on the retaining end of said retaining member so as to define a first variable volume chamber therebetween;
  (ii) a second end with inner and outer axially extending annular bearing members, each concentric with and normally rotatably abutting a corresponding one of the sealing surface portions, so as to define annular side walls of a second chamber between the first end and the sealing end of said sealing member, which second chamber is interconnected with the first chamber;
such that fluid pressure produced in the first chamber as a result of axial pressure pushing said retaining member toward said sealing member, is transmitted to said second chamber.

3. A rotary joint as described in claim 1 or 2 wherein said central member has a first inner surface defining a wall of the first chamber and axially facing the retaining end of said retaining member, and a second inner surface defining a wall of the second chamber and axially facing the sealing end of said sealing member.

4. A rotary joint as described in claim 2 wherein said central member has a first inner surface axially facing the retaining end of said retaining member and a second inner surface axially facing the sealing member, the total transverse area of said first inner surface being at least as great as the total transverse area of said second inner surface.

5. A rotary joint as described in claim 4 wherein the total transverse area of the first and second inner surfaces of said central member are equal.

6. A rotary joint as described in claim 5 additionally comprising resilient means extending between said retaining member and said sealing member, for urging the bearing members against respective sealing surface portions.

7. A rotary joint as described in claim 2 additionally comprising resilient means extending between said retaining member and said sealing member, for urging the bearing members against respective sealing surface portions.

8. A rotary joint as described in claim 4, 5 or 6 wherein the first and second chambers are interconnected by means of an opening through said central member.

9. A rotary joint as described in claim 5, 6 or 7 wherein the sealing surface portions of said sealing member lie in a common transverse plane, and the bearing members extend substantially perpendicular from respective sealing surface portions.

10. A rotary joint as described in claim 4, 5 or 6 wherein the first and second chambers are interconnected by means of an opening through said central member, the sealing surface portions of said sealing member lie in a common transverse plane, and wherein the bearing members extend substantially perpendicular from respective sealing surface portions.

11. A rotary joint as described in claim 4, 5 or 6 wherein the first end of said central member is slidably mounted within an annular recess in the retaining end of said retaining member, the first and second chambers have the same average diameter and are interconnected by means of an opening through said central member, the sealing surface portions of said sealing member lie in a common transverse plane, and wherein the bearing members extend substantially perpendicular from respective sealing surface portions.

* * * * *